Oct. 20, 1936.  A. J. RINGZELLI  2,057,980
AERIAL MOUNTING
Filed July 12, 1934
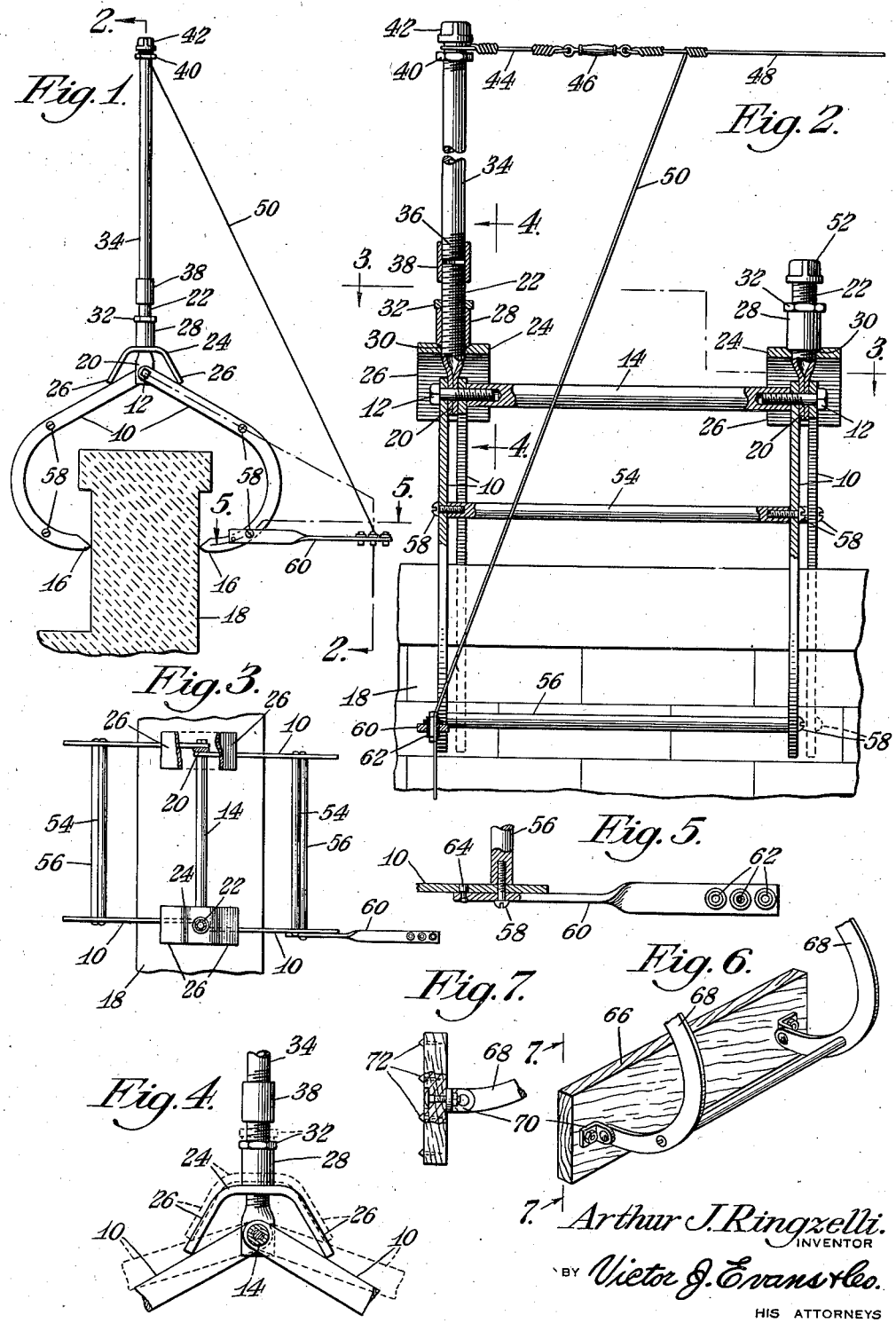
Arthur J. Ringzelli.
INVENTOR
BY Victor J. Evans & Co.
HIS ATTORNEYS Patented Oct. 20, 1936

2,057,980

UNITED STATES PATENT OFFICE 2,057,980

AERIAL MOUNTING

Arthur J. Ringzelli, Chicago, Ill., assignor of one-half to William Petry, Chicago, Ill.

Application July 12, 1934, Serial No. 734,845

5 Claims. (Cl. 248—43)

My invention relates to aerials, and has among its objects and advantages the provision of an improved aerial mounting.

In the accompanying drawing:

Fig. 1 is a view illustrating the device mounted upon a coping;

Fig. 2 is a sectional view along the line 2—2 of Fig. 1;

Fig. 3 is a top plan view, partly in section;

Fig. 4 is a sectional view along the line 4—4 of Fig. 2;

Fig. 5 is a sectional view along the line 5—5 of Fig. 3;

Fig. 6 is a perspective view of a slightly different form; and

Fig. 7 is a view taken along the line 7—7 of Fig. 6.

In the embodiment selected to illustrate my invention, I make use of four grip members 10 grouped in pairs and pivotally connected together through the medium of bolts 12. These bolts are screwed into threaded openings in the ends of a bar 14, see Fig. 2. In Fig. 1, I illustrate the grip members as being bent for arranging the ends 16 in each pair to grip opposite sides of the coping 18. I prefer to make the ends pointed so that firm anchorage is attained in connection with brick or stone walls.

In Fig. 2, the grip members 10 in each pair are spaced apart to receive the flattened end 20 of a threaded tube 22. An opening is provided in the flattened part 20 to receive its respective bolt 12. Upon each tube 22, I mount a clamp member 24 having an opening to loosely receive its respective tube 22. This clamp member is bent to provide flange parts 26 having their ends arranged in contact with the grip members 10, see Fig. 1.

Means for forcing the clamp members 24 into clamping relation with their respective grip members 10 comprises a sleeve 28 mounted upon each of the tubes 22 and having threaded relation therewith. When this sleeve is screwed down, its lower end engages its associated clamp member 24 and causes a pivotal action of the grip members 10 about the axis of the bolt 12 so that the ends 16 will grip the coping 18 for holding the aerial structure in firm assembly with the coping. I prefer to provide a tapered area 30 as a part of the opening in the clamp members 24 for receiving the tapered end of the sleeve 28. A lock nut 32 may be mounted upon each of the tubes 22 for fastening the sleeves 28 in position.

My aerial mast 34 comprises a tube having a threaded end 36 connected in axial alignment with one of the tubes 22 through the medium of a union 38. In Fig. 2, the mast 34 has its upper end threaded to receive a nut 40 and a cap 42 between which the loop end of a wire 44 is connected. This wire carries an insulator 46 connected with the aerial 48, which in turn in connected with the lead in wire 50. Of course, two mast mounting units are employed for the aerial 48. However, three units will accommodate two aerials. To this end, a second mast 34 may be connected with the tube 22 having the cap 52, see Fig. 2. In this way, two mast units, each having one mast 34, may be associated with one unit having two masts to accommodate the two aerial arrangement with three mast mounting units.

However, two units will accommodate two aerials in cases where the units are mounted upon opposite sides of the building. This arrangement is advisable in cases where the width of the building is sufficient to accommodate an aerial of proper length. The loose connection between the loop parts of the wire 44 and the mast permits the aerial to be arranged in various alignments.

To make a sturdy construction, I arrange two bars 54 and 56 between each pair of grip members 10 grouped for clamping opposite sides of the coping 18. These bars are provided with threaded openings for the reception of fastening screws 58. An arm 60 is fastened to one of the grip members 10 for supporting the lead in wire 50 in spaced relation with the coping and the wall part of the building structure. This arm is provided with a plurality of insulated openings 62 for the reception of one or more lead in wires. Referring to Fig. 5, the arm is provided with an opening for the reception of one of the screws 58 and is provided with a pin 64 projecting through an opening in the grip member 10 to which the arm is connected. In this way, the arm is clamped in firm assembly with the grip member when its respective screw 58 is turned down.

When the sleeve 28 is screwed down tightly against its respective clamp member 24, all the movable parts of the unit at that end will be clamped into a rigid assembly. The clamp member 24 operates to align the tube part 22 in a vertical position, so that the tube 22 will always bisect the angle between the grip members 10.

In certain cases it may be desirable to protect the coping 18 from the points 16 of the grip members. To this end, I pivotally connect a plank 66 with the ends of the grip members 68 through the medium of brackets 70. This planking may be provided with a plurality of small lugs 72 arranged to be imbedded in the coping wall when the members 68 are clamped in position. Obviously, an individual pad for the end of each of the clamp members 68 may be pivotally connected therewith in lieu of the plank 66.

The foregoing will so fully explain my invention that others may, by applying current knowledge, readily adapt the same for use under various conditions of service.

I claim:

1. An aerial mast mounting comprising two pairs of grip members shaped to pass over the coping of a wall structure, a bar arranged to hold said pairs of grip members in spaced apart relation, a bolt for pivotally connecting each pair with one end of said bar, the grip members in each pair being spaced apart, a vertical member arranged between the grip members in each pair and pivotally connected with the bolt associated with that pair, a clamp member loosely connected with each vertical member for moving the grip members into clamping relation with the coping, means co-operating with each vertical member to force its respective clamp member into clamping relation with the grip members, and a mast connected with one of said vertical members.

2. An aerial mast mounting comprising two pairs of grip members shaped to pass over the coping of a wall structure, a bar arranged to hold said pairs of grip members in spaced apart relation, a bolt for pivotally connecting each pair with one end of said bar, the grip members in each pair being spaced apart, a vertical member arranged between the grip members in each pair and pivotally connected with the bolt associated with that pair, a clamp member loosely connected with each vertical member for moving the grip members into clamping relation with the coping, means co-operating with each vertical member to force its respective clamp member into clamping relation with the grip members, and bar means for interconnecting the grip members, and a mast connected with one of said vertical members.

3. In a mast mounting, two pairs of grip members, the members in each pair being pivotally connected together with the other grip member in that pair, means for operatively connecting the two pairs of grip members in spaced relation, a vertical extension loosely connected with the pivotal connection between the grip members in each pair, and means associated with said vertical extensions and said pairs of grip members, to clamp the vertical extensions and the grip members into a rigid assembly upon a supporting structure.

4. A mast mounting comprising two pairs of grip members, means for pivotally connecting the grip members, means for operatively connecting the two pairs of grip members in spaced relation, a mast movably connected with the pivotal connection between the grip members of one pair, means associated with said mast for clamping the mast and the grip members of the said one pair into a rigid assembly upon a supporting structure, said means being arranged to support the mast in a vertical position, and means for clamping the grip members of the other pair upon the supporting structure.

5. An aerial mast mounting comprising two pairs of grip members shaped to pass over the coping of a wall structure, a bar arranged to hold said pairs of grip members in spaced apart relation, a bolt for pivotally connecting each pair with one end of said bar, the grip members in each pair being spaced apart, a vertical member arranged between the grip members in each pair and pivotally connected with the bolt associated with that pair, a clamp member loosely connected with each vertical member for moving the grip members into clamping relation with the coping, means co-operating with each vertical member to force its respective clamp member into clamping relation with the grip members, bar means for interconnecting the grip members, a mast connected with one of said vertical members, and a guide member for a lead in wire connected with a part of said bar means.

ARTHUR J. RINGZELLI.